A. ROSENTHAL.
CORN HUSKER AND ENSILAGE CUTTER AND SILO FILLER.
APPLICATION FILED SEPT. 20, 1912.
1,228,971.
Patented June 5, 1917.
5 SHEETS—SHEET 1.
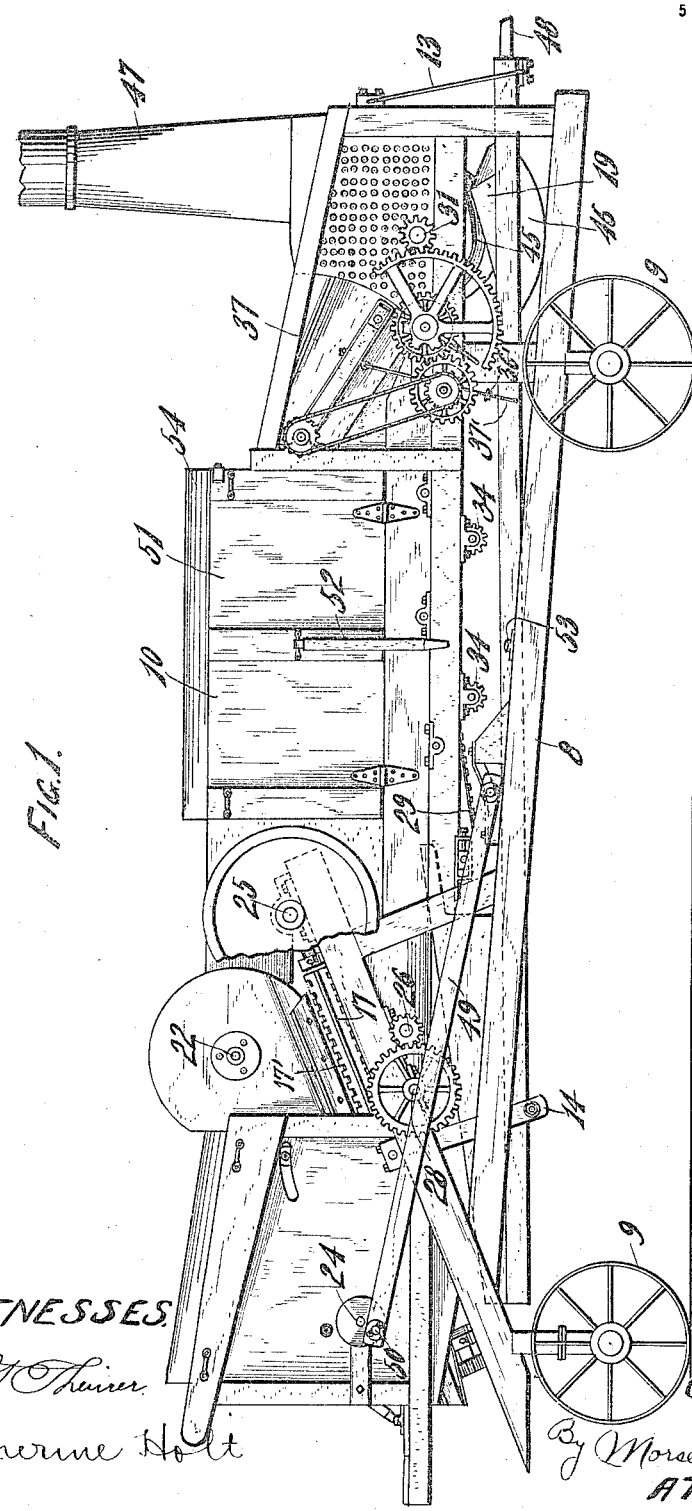
WITNESSES
INVENTOR
August Rosenthal
By Morsell & Caldwell
ATTORNEYS

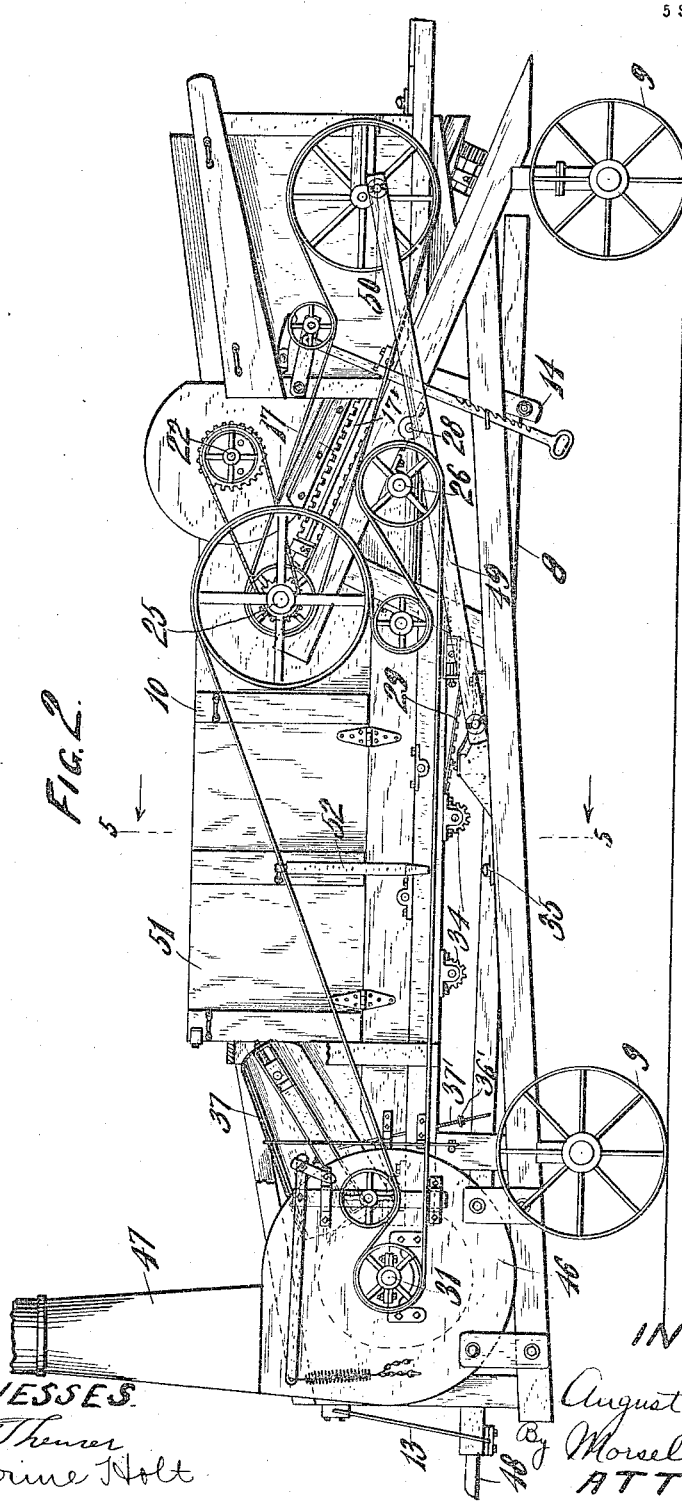

A. ROSENTHAL.
CORN HUSKER AND ENSILAGE CUTTER AND SILO FILLER.
APPLICATION FILED SEPT. 20, 1912.
1,228,971.
Patented June 5, 1917.
5 SHEETS—SHEET 3.
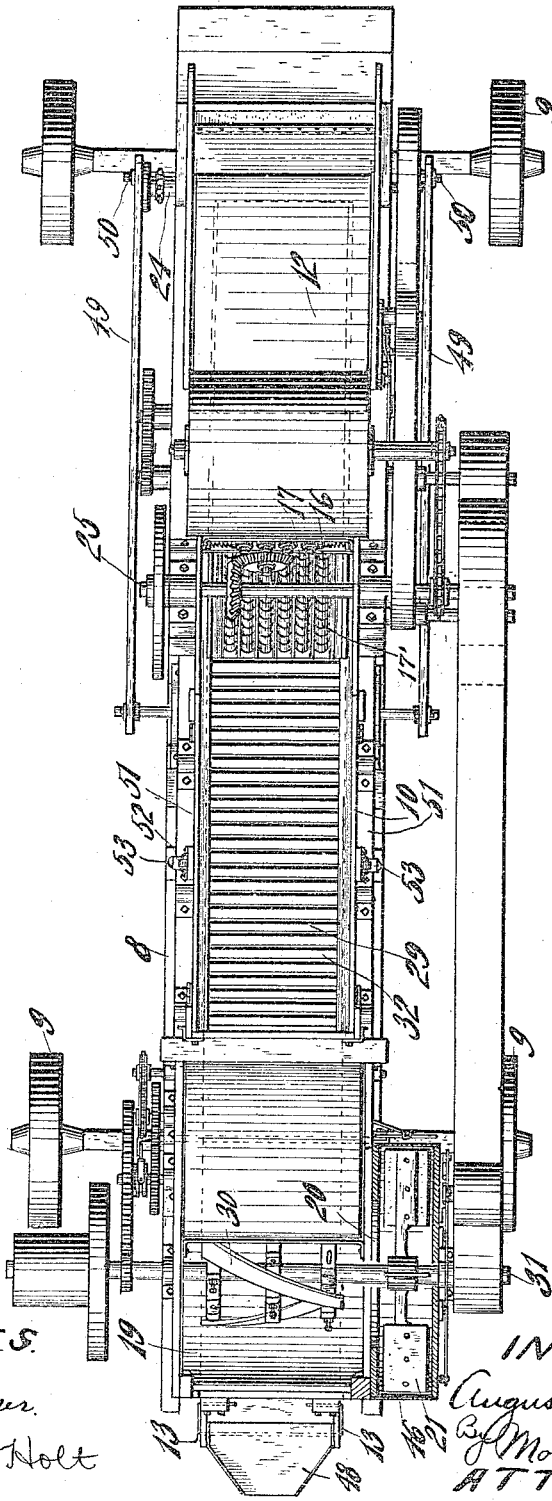
WITNESSES.
INVENTOR.
August Rosenthal
By Morsell & Caldwell
ATTORNEYS.

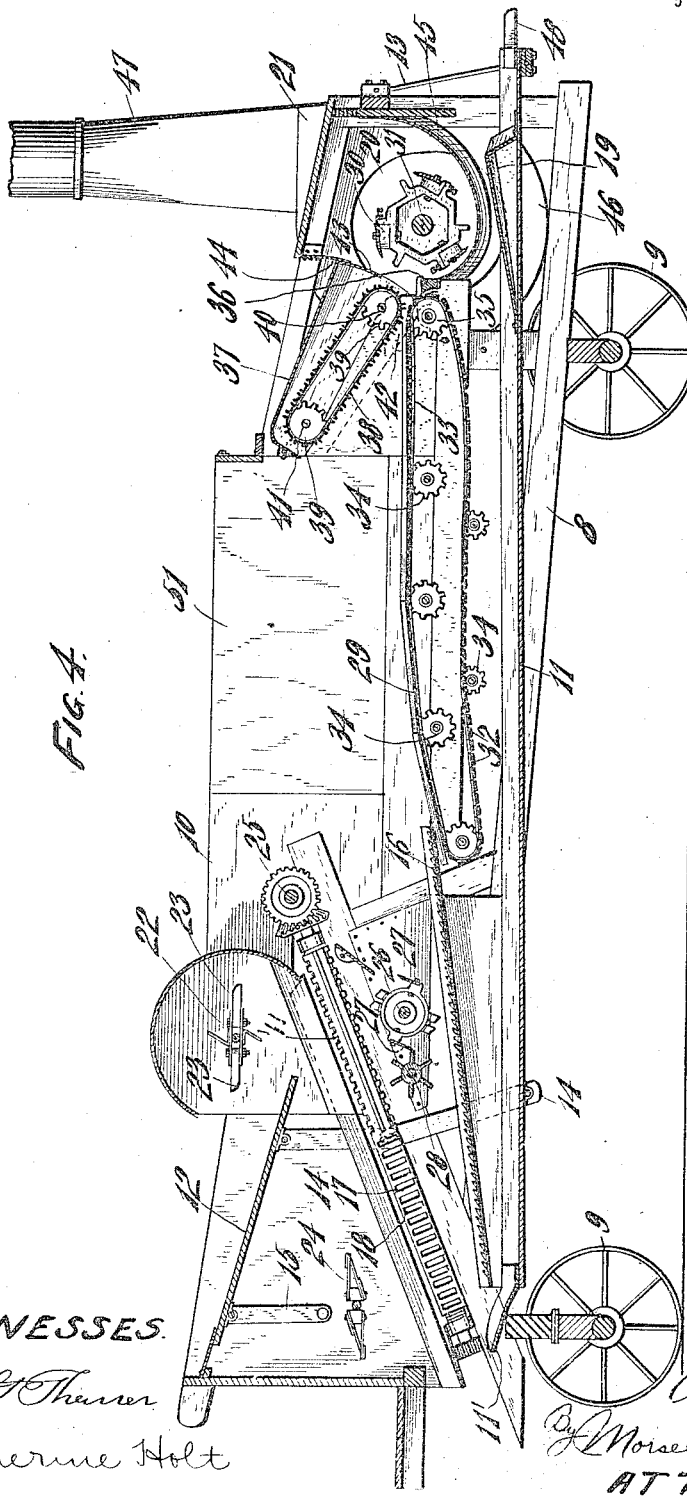

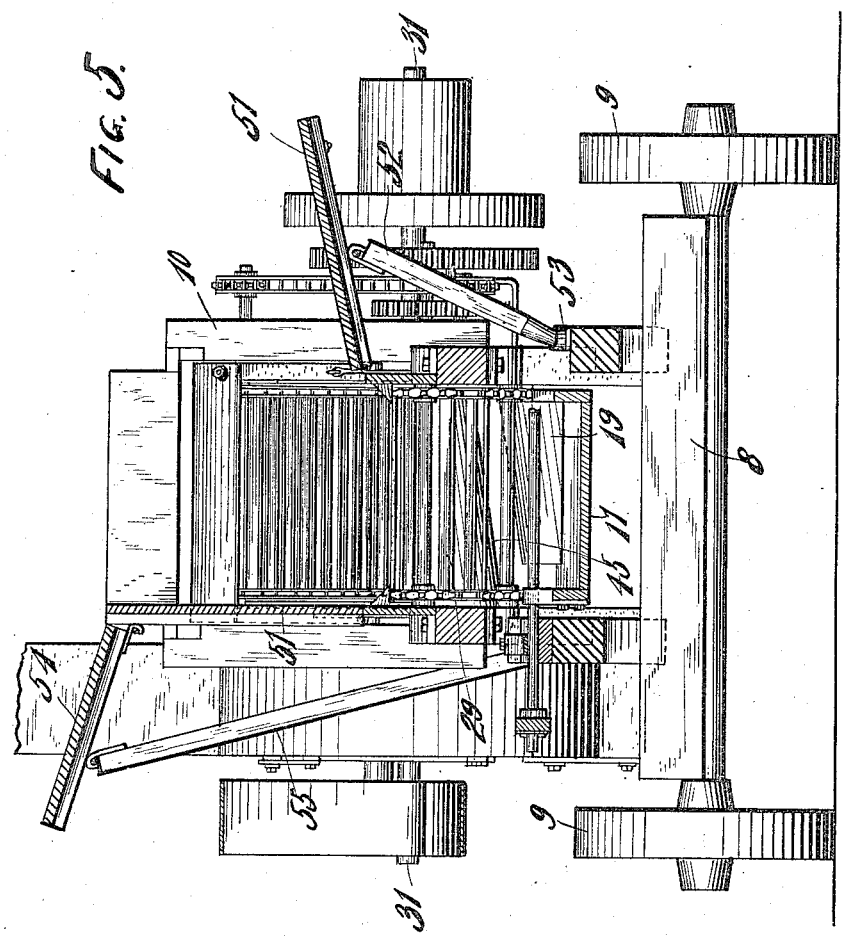

UNITED STATES PATENT OFFICE.

AUGUST ROSENTHAL, OF WEST ALLIS, WISCONSIN.

CORN-HUSKER AND ENSILAGE-CUTTER AND SILO-FILLER.

1,228,971.   Specification of Letters Patent.   Patented June 5, 1917.

Application filed September 20, 1912. Serial No. 721,348.

*To all whom it may concern:*

Be it known that I, AUGUST ROSENTHAL, a citizen of the United States, and resident of West Allis, in the county of Milwaukee and State of Wisconsin, have invented new and useful Improvements in Corn-Huskers and Ensilage-Cutters and Silo-Fillers, of which the following is a description, reference being had to the accompanying drawings, which are a part of this specification.

This invention relates to improvements in a corn husker and ensilage cutter and silo filler.

Heretofore it has been necessary in preparing fodder material for the silo, when formed in whole or in part of corn, to run the corn stalks with the ears through an ensilage cutter and silo filler to cut the material to the desired extent and to elevate the cut material into the silo, and in some cases, when it was desired to remove part or all of the ears of corn, it was necessary to snap off and remove said ears by hand before feeding to the cutter. This arrangement necessitated the rehandling of the material a number of times.

The primary object of this invention is to provide a simple, economical and effective machine for preparing and delivering ensilage stock to a silo.

A further object of the invention is to provide a corn husker and ensilage cutter and silo filler which will husk and shred corn and cut the fodder or ensilage portion of the corn and elevate it into a silo during one continuous operation without the necessity of rehandling the material.

A further object of the invention is to provide a corn husker and ensilage cutter and silo filler which is also adapted to cut all kinds of material and in which different kinds of material may be cut and mixed and elevated to the silo.

A further object of the invention is to provide a corn husker and ensilage cutter and silo filler which may be used to husk corn only, or to cut fodder only, or which may be used to cut both jointly and to separate and discharge the husked corn from the fodder.

A further object of the invention is to provide a corn husker and ensilage cutter and silo filler in which corn husked by a portion of the machine is moved to a position where it will be subjected to a cleaning suction and the waste portions therefrom will be elevated to the silo.

A further object of the invention is to provide a corn husker and ensilage cutter and silo filler in which the feed table is vibrated by the movement of the grain pan and shaker to expedite the feed of material to the machine.

A further object of the invention is to provide a corn husker and ensilage cutter and silo filler of simple construction and which is strong and durable and is well adapted for the purpose desired.

With the above and other objects in view, the invention consists of the improved corn husker and ensilage cutter and silo filler and its parts and combinations, as set forth in the claims, and all equivalents thereof.

In the accompanying drawings in which the same reference characters indicate the same parts in all of the views:

Figure 1 is a side view of the complete corn husker and ensilage cutter and silo filler, parts broken away to show interior construction;

Fig. 2 is a similar view of the opposite side of the machine;

Fig. 3 is a top view thereof, parts broken away to show the interior construction;

Fig. 4 is a medial longitudinal vertical sectional view of the corn husker and ensilage cutter and silo filler; and Fig. 5 is a transverse vertical sectional view thereof taken on line 5—5 of Fig. 2.

Referring to the drawings the numeral 8 indicates the framework of the improved machine which is mounted upon wheels 9 for convenience in transportation. A casing 10, mounted on this frame, is provided with a vibrating bottom trough or pan 11 forming the bottom of the casing, and with a vibrating feed board 12 forming the top of the feed end portion of the casing. The vibrating pan is connected to the lower ends of links 13 and 14, which are pivotally connected to and depend from the casing and the links 14 extend upwardly above their pivotal connection with the frame and are pivotally connected to the lower end portion of the feed board and serve to vibrate the board and support the lower end thereof. The feed end portion of the pan is provided with an extension 11′, formed of leather or other flexible material, to close the space between the end of the pan and the husking rolls. The upper end of the feed board is pivotally connected to the upper ends of links 15 (only one being shown). The bottom portion or pan 11 supports and also vibrates the toothed sieve 16 positioned above the rear portion of the pan.

Rolls 17, mounted in the casing and positioned between the feed board and the sieve are provided with upper portions 17' for snapping the ears of corn from the stalks and other lower portions 18 of the rolls are adapted to remove the husks from the ears as they are worked downwardly on the rolls. For convenience these rolls will be referred to as husking rolls. The kernels of corn which may be removed from the ears during this husking operation will pass between the rolls and drop on the sieve and will pass through the sieve and drop to the vibrating pan beneath, which will advance the corn to the discharge end of the machine. In thus advancing the corn will be worked over the inclined portion 19 of the pan before being discharged from the pan. This inclined portion is placed opposite to the mouth or opening 20 of the fan 21 and subjects the corn to a more direct draft of the fan to remove foreign matter therefrom.

The corn stalks in working down the feed board will be engaged by a rotary beater 22 extending transversely across the casing and in the path of movement of the stalks. The beater is provided with fingers or knives 23 which are adapted to engage the material and pull it endwise toward the husking rolls. The major part of the material thus moved will be grasped by the snapping portions of the husking rolls and the part not grasped by said rolls will be carried around with the beater and again presented to the husking rolls and finally engaged thereby.

A rotary retarding member 24, positioned above the lower ends of the husking rolls and transversely of the casing, serves to prevent the material from working down the husking rolls without being engaged thereby.

The husking rolls have a geared connection with a transversely extending driving shaft 25 mounted on the frame. A rotary cutter 26, positioned between the husking rolls and the vibrating sieve, is adapted to cut into short lengths the corn stalks which pass through the snapping portions of the husking rolls.

The knives 27 of the cutter engage a rotary knife or shear bar 28 mounted in the case. The cut stalk material will drop on the sieve 16, the reciprocation of which will advance and deposit the material on the endless belt or conveyer 29. The said belt is located above the vibrating pan and extends from a point beneath the forward end of the screen to a position adjacent to a rotary fodder cutter 30 mounted on the same shaft 31 that the fan 21 is mounted on. This belt is formed of transverse slats 32 extending the width of the casing and mounted on endless sprocket chains 33 carried by the sprocket wheels 34 and 35. The sprocket wheels 35 are positioned adjacent to the fixed cutter bar 36 of the rotary cutter 30. A swinging frame 37, positioned above the discharge end portion of the endless belt 29, carries an auxiliary upper endless feed belt 38 which extends downwardly at an incline toward the discharge end of the lower feed belt to form a contracted opening or throat to the fodder cutter 30. The upper belt is similar in construction to the lower belt and is rotated by the sprocket wheels 39 mounted on transverse shafts 40 and 41 of the swinging frame. The shaft 41 of this frame extends through the swinging frame and is mounted in the casing and the pivotal connection of the swinging frame is concentric therewith to provide for permitting the lower end of the auxiliary belt and frame to swing upwardly and downwardly to increase or diminish the opening or throat 42 to the fodder cutter. The movement of the swinging frame is adjustably limited by the threaded rods 37' which are pivotally connected to the swinging frame and depend therefrom through the main frame 8 and are provided with nuts 36' which serve as stops. The swinging frame forms a cover over the auxiliary feed belt and at its discharge end is provided with an end 43 curved concentrically with respect to the pivotal connection of the swinging frame with the casing, and the portion 44 of the cutter inclosure 45 is likewise curved to form a close joint between the swinging frame and the inclosure. The material carried on the endless belt will be cut by the fodder cutter and will be drawn down the inclined bottom portion 45 of the cutter inclosure into the fan casing 46 and elevated by the fan thereof through the fan tube 47 and into the silo (not shown) or conveyed to a desired distant point.

While the cut material is being moved on the endless belt any kernels of corn which may be mixed in the material will drop through the spaces between the slats on the vibrating pan and be advanced thereby and discharged from the spout 48 projecting from the end of said pan.

The different parts of the machine are rotated in the ordinary manner by belts and gears, and the pan, sieve and feed board are vibrated by link connections 49 which are connected to and extend from the pan to cranked wrist pins 50 of the shaft of the retarder 24.

The medial portions of the casing on opposite sides are provided with doors 51 hinged on their lower edges to the casing and adapted to be swung outwardly to form an inclined feed from either side of the machine when it is desired to feed other material to the machine without having said material acted upon by the husking rolls or cutter. These doors are supported in their open position by rods 52 which are hinged at their upper ends to the doors and are adapted to have their lower ends inserted into the sockets 53 of the frame.

A removable feed board 54, hooked to one of the side boards and supported by a hinged rod 55, is also provided to form a convenient feed table on the side opposite to the side open for feeding.

If desired the cutting mechanism beneath the husking rolls may be dispensed with without departing from the spirit and scope of the invention, or crushing or shredding mechanism may be substituted therefor, the essential feature of the invention under all conditions embodying mechanism for husking and separating ears of corn from the stalks and cutting said stalks and other material to form ensilage material and also for acting upon all other material suitable for this purpose.

From the foregoing description it will be seen that a corn husker and ensilage cutter and silo filler is provided which is of very simple construction and is adapted to be independently used for husking corn and cutting and elevating fodder, or may be used to combine these operations, or to cut and mix various kinds of fodder together.

What I claim as my invention is:

A silo filler comprising a frame, a combined corn husker and shredder mounted at one end of said frame, an ensilage cutter mounted on the other end of the frame, means disposed between the combined corn husker and shredder and the ensilage cutter for conveying the material from the husker and shredder to the ensilage cutter, a feed board mounted on the frame adjacent said conveying means for feeding other material to the conveying means to mix the same with the material from the combined shredder and husker previous to its passage through the ensilage cutter, means for conveying the mixed fodder away from the ensilage cutter, and means for conjointly operating said husker, shredder, ensilage cutter, and said conveying means.

In testimony whereof, I affix my signature, in presence of two witnesses.

AUGUST ROSENTHAL.

Witnesses:
C. H. KEENEY,
CLARA V. MUEHLBACH.

Copies of this patent may be obtained for five cents each, by addressing the "Commissioner of Patents, Washington, D. C."